United States Patent
Kurokawa

(10) Patent No.: US 8,089,257 B2
(45) Date of Patent: Jan. 3, 2012

(54) SIGNAL COMPARISON CIRCUIT AND POWER CONVERSION DEVICE

(75) Inventor: Fujio Kurokawa, Yanagawa-machi (JP)

(73) Assignee: Nagasaki University, National University Corporation, Nagasaki-Shi (JP)

( * ) Notice: Subject to any disclaimer, the term of this patent is extended or adjusted under 35 U.S.C. 154(b) by 538 days.

(21) Appl. No.: 12/224,225

(22) PCT Filed: Feb. 21, 2007

(86) PCT No.: PCT/JP2007/053710
§ 371 (c)(1),
(2), (4) Date: Dec. 12, 2008

(87) PCT Pub. No.: WO2007/097465
PCT Pub. Date: Aug. 30, 2007

(65) Prior Publication Data
US 2009/0219055 A1  Sep. 3, 2009

(30) Foreign Application Priority Data
Feb. 21, 2006  (JP) .................................. 2006-044499

(51) Int. Cl.
*G05F 1/40* (2006.01)

(52) U.S. Cl. ..................... 323/285; 323/282; 323/283

(58) Field of Classification Search ................... 323/268, 323/271, 282–285
See application file for complete search history.

(56) References Cited

U.S. PATENT DOCUMENTS

| 7,183,757 B2* | 2/2007 | Nagai ........................... 323/285 |
| 2005/0135036 A1 | 6/2005 | Kanamori et al. |
| 2010/0019749 A1* | 1/2010 | Katsuya et al. ............... 323/282 |
| 2011/0025283 A1* | 2/2011 | Futamura ...................... 323/282 |

FOREIGN PATENT DOCUMENTS

| JP | A-2005-006391 | 1/2005 |
| JP | A-2005-184991 | 7/2005 |

* cited by examiner

*Primary Examiner* — Matthew Nguyen
(74) *Attorney, Agent, or Firm* — Oliff & Berridge, PLC

(57) ABSTRACT

The voltage deviation is converted into the time quantity with the first integration circuit for the voltage detection and the second integration circuit for the voltage detection. The current setting value and the current measurements are converted into the time quantity with the second integration circuit for the current control to which the first integration circuit for the current control from which the voltage value of the set current value corresponding is input and the voltage value of the value of the current of the inductor corresponding are input and it controls. And, the start of the first integration circuit for the current control is delayed with operation quantity signal generation circuit only at the time that the high-resolution evaluation or more than the start of the first integration circuit for the current control and corresponds to the voltage deviation.

6 Claims, 20 Drawing Sheets

(A)

(B)

(A)

(B)

(A)

(B)

(C)

(A)

(B)

(A)

(B)

(C)

(A)

(B)

SIGNAL COMPARISON CIRCUIT AND POWER CONVERSION DEVICE

TECHNICAL FIELD

The present invention concerns to the power converter that has the signal comparison circuit generating a target signal from the analog quantity and the digital quantity, the comparison circuit. The power converter can on-off control the current that flows from DC power aiming at the inductor in high accuracy by using the current limit circuit based on the deflection between the output voltage value and the target output voltage value that the output voltage detection circuit detected, and can digitalized the control operation circuit.

BACKGROUND OF THE TECHNICAL ART

Electric power conversion device 9 of the current inject type shown in FIG. 19 (DC/DC converter) is known so far.

This electric power conversion device 9 consists of the control circuit 91, the driving circuit 92 and the converter circuit 93. The converter circuit 93 consists of the power supply $E_i$, the transistor switch $T_r$, the resistance $R_s$ for detecting current, the inductor L, the flywheel diode $F_D$, and the output capacitor C.

The control circuit 91 detects the current that flows in output voltage $e_o$ and the inductor L as voltage down $e_s$ of the resistance $R_s$.

The control circuit 91 controls input current ii by operating the transistor switch $T_r$ on-off so that $e_o$ may approach $e_o^*$ (deflection must become 0), referring to the value of voltage down $e_s$.

In this electric power conversion device 9, the value in which preset gain $K_p$ is multiplied to deflection named $e_o$ and $e_0^*$ as shown in FIG. 19 and the value in which compensatory signal $S_h$ was added to bias $e_c$ are added. And peak voltage $e_p$ are made.

The comparator compares peak voltage $e_p$ and voltage Vs (it is generated with putting preset gain $A_{cc}$ on voltage descent $e_s$). And, the comparison result is input to the flip-flop FF circuit that operates by driving signal SS (sampling cycle $T_s$). As a result, control signal $S_c$ of which the duty is the time to reaching to the peak voltage $e_p$ is generated. The driving circuit 92 controls transistor switch $T_r$ based on this control signal $S_c$.

By the way, the response accuracy of electric power conversion circuit 9 of FIG. 19 (control accuracy) depends on the resolution of control signal $S_c$ as shown in FIG. 20. The frequency of the practicable oscillator used for the electric power conversion circuit 9 is 100 MHz now. Therefore, the response accuracy of electric power conversion circuit 9 is not good.

The purpose of the present invention is to be able to on-off control the current that flows from the power supply aiming at the inductor in high accuracy and to digitalize the control operation circuit.

MEANS FOR SOLVING PROBLEM

Present invention is characterized below.
(1) The signal comparison circuit for generating target signal from analog quantity and digital quantity, comprising,
the first integration circuit that inputs reference signal and outputs integration value,
the second integration circuit that inputs the said analog quantity and outputs integration value,
the operation signal generation circuit that converts the said digital quantity into the time quantity, and shifts the operation start timing of the said the first integration circuit to the operation start timing of the said the second integration circuit, and,
the target signal generation circuit that compares the time to each reaching to the threshold by the first integration circuit and the second integration circuit and generates the said target signal.
(2) A signal comparison circuit according to (1), wherein the said analog quantity is the second analog quantity and the said digital quantity is generated from the first analog quantity.
(3) The power converter by which the output voltage detection circuit detects output voltage value (analog quantity of first), and the current limit circuit on-off controls current (analog quantity of second) that flows from DC power aiming at inductor based on deflection between analog quantity of first and target output voltage value, wherein,
the said output voltage detection circuit has the operation quantity signal generation circuit that generates the operation quantity signal that changed the timing of standing up of reference clock signal with resolution that is higher than the frequency of the said reference clock at time only at time corresponding to a digital numerical value (the said digital quantity) that corresponds to the deflection between the output voltage value and the target output voltage value.

The said current limit circuit has the first integration circuit for the current control, the second integration circuit (the said the second integration circuit) for the current control, and the current control signal generation circuit (the said target signal generation circuit), wherein,
the said the first integration circuit for the current control inputs the voltage (reference signal) provided depending on the peak value of the current that flows in the said the inductor according to the timing of standing up of the said operation quantity signal and outputs the first integration value for the current control,
the said the second integration circuit for the current control outputs the voltage that corresponds to the current that flows in the said inductor, and it inputs repeatedly and the second integration value for the current control is output two or more times again once according to the timing that synchronizes with standing up of the said reference clock signal,
the said current control signal generation circuit compares the time to reaching to the second preset value by the said the second integration value to reaching to the first preset value by the said the first integration value for the current control for time and the current control,
the time to reaching to the first preset value by the first integration value for current control is,
(a) to the said value the second integration value for control current below the equal following the time to reaching,
(b) to the said value the second integration value for control current more than the equal more than the time to reaching, the current that flows the said DC power aiming at the said inductor is turned off.
(4) A signal comparison circuit according to claim (1), (2), (3), wherein the said output voltage detection circuit has,
the first integration circuit for voltage detection that inputs the output voltage value according to the timing of a preset clock, and outputs the first integration value for the voltage detection,
the second integration circuit for voltage detection that inputs the target output voltage value according to the timing of the said clock, and outputs the second integration value for the voltage detection, the second integration circuit for the voltage detection that inputs the target output voltage value according to the timing of the preset the said clock and outputs the second integration value for the voltage detection, The second integration circuit for voltage detection that inputs the target output voltage value according to the timing of the preset the said clock and outputs the second integration value for the voltage detection, the second integration circuit for the voltage detection that inputs the target output voltage value according to the timing of the preset the said clock and outputs the second integration value for the voltage detection, the output deflection detection circuit that does the difference with the time to reaching to the second preset value by the second integration value to reaching to the first preset value by the first integration value for the voltage detection for time and the said voltage detection and several in total is done according to the number of pulses of clocks for the voltage deflection detection, and this calculation value is output as a digital deviation value in which the deflection between the said output voltage value and e the said target output voltage value is shown, the control operation circuit that inputs the said digital deviation value, and generates a digital numerical value to control the said current control circuit based on the said digital deviation value, wherein:

the said operation quantity signal generation circuit inputs the standard clock signal that becomes a standard of the time of operation in the said digital numerical value and the said current control, circuit, and generates the operation quantity signal that changed the timing of the said standard clock signal at time only at time corresponding to the said digital numerical value.

(5) A signal comparison circuit according to claim (3), (4),
wherein the said operation quantity signal generation circuit has,
the decoder that inputs digital numerical value to control the said current limit circuit, and outputs two or more bit signal,
the delay circuit that inputs the said two or more bit signal and the said standard clock signal.

(6) A signal comparison circuit according to claim (3), (4),
wherein the said operation quantity signal generation circuit has,
the digital-to-analog converter that inputs a digital numerical value to control the said current control circuit, and outputs the analog threshold voltage.
the comparator that outputs the comparison value of an integration circuit, the said integration value voltage, and the said analog threshold voltage in which the said standard clock signal is input and the integration value voltage is output.

EFFECT OF THE INVENTION

Figure 1:
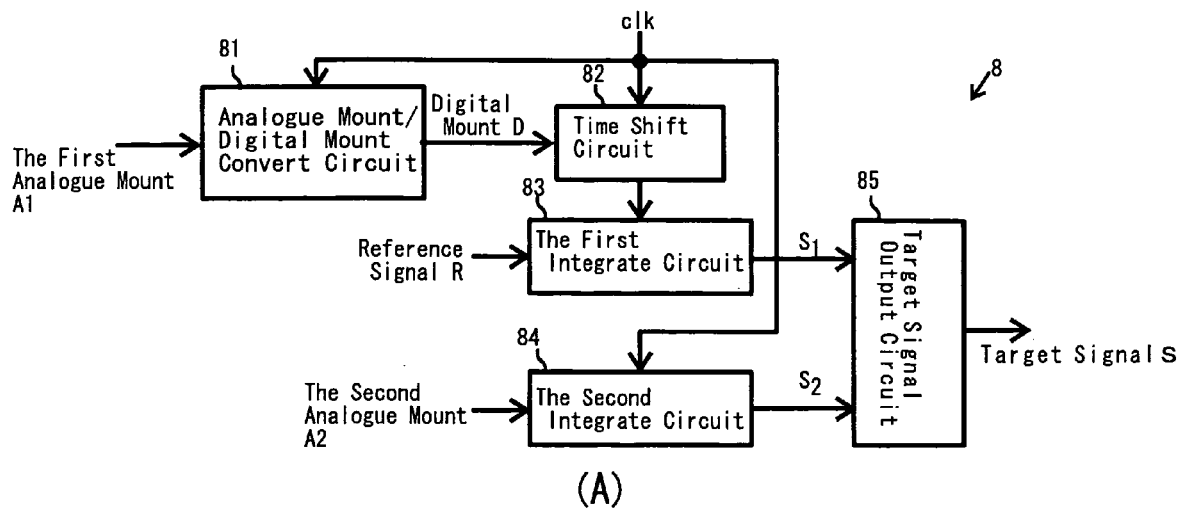
FIG. 1: It is an explanation diagram of the comparison of signals of the present invention circuit.
Figure 1:
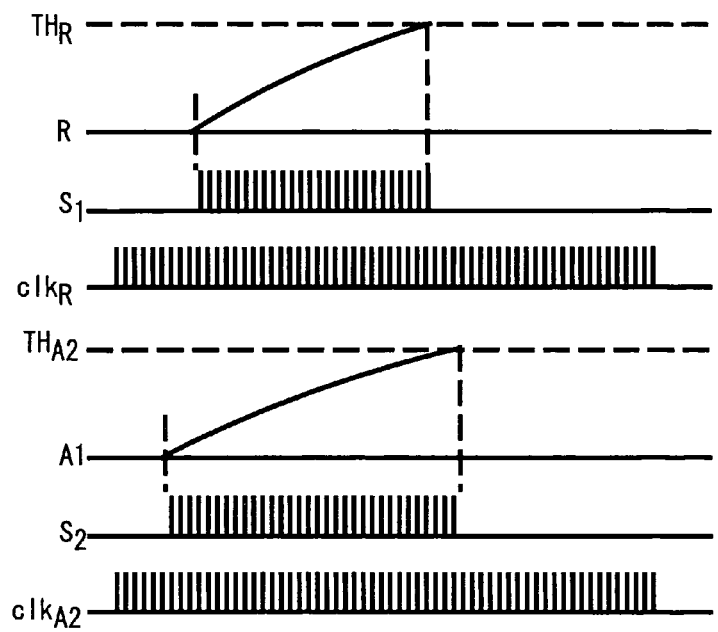

In the power converter of the present invention, the voltage detection circuit has been digitalized. Therefore, various operation quantity signals are generable.

In the power converter of the present invention, the other integration start time of two integration circuits used for the current control is shifted. This shift time is an quantity that corresponds to deflection, and resolution is high. Therefore, high accuracy is controlled.

In the power converter of the present invention, the current peak is suppressed in high accuracy. Therefore, when input (Ei) of DC power is unstable, the present invention is suitable.

MODE FOR CARRYING OUT THE (CLAIMED) INVENTION

FIG. 1(A) is a composition diagram wherein an execution form of the comparison of signals of the present invention circuit is shown. The signal comparison circuit 8 consists of "analog quantity/digital quantity conversion circuit" 81, the operation signal generation circuit 82, the first integration circuit 83, the second integration circuit 84, and a target signal output circuit 85 in FIG. 1(A).

The analog quantity/digital quantity conversion circuit 81 generates the digital quantity D (digital signal) from the first analog quantity A1 (analog signal). The conversion circuit 81 can execute the operation processing (of the digital filter processing etc.) to digital quantity D.

The circuit for generating the time operation signal generating circuit" 82 shifts the operation start timing of the first integration circuit to the operation start timing of the second integration circuit by changing the digital quantity into the time quantity.

The first integration circuit 83 inputs the reference signal R and outputs the integration value $S_1$. The second integration circuit 84 inputs the second analog quantity A2 and outputs the integration value $S_2$. The signal comparison circuit 85 compares the time until the first integration circuit 83 reaches the threshold value and the time until the second integration circuit 84 reaches the threshold value The analog quantity/digital quantity conversion circuit 81, the circuit 82 the first integration circuit 83 and the second integration circuit 84 can be operated with the clock of integral multiples of clock clk on substance by multi-phase processing reference clock clk.

Or, that is, N clocks are generated from the reference clock, wherein the frequency of said N clocks are the same with the clock of the reference clock clk.

The first clock delays only $T_P/N$ for the reference clock, the second clock delays only $2T_P/N$ for the reference clock, . . . , and the Nth clock delays only (N–1) TP/N. These delay signals is synthesized, and a new high resolution clock is formed. High-speed operation can be done by adopting this synthetic signal as the new clock.

FIG. 1(B) shows the reference signal R (The threshold is shown with THR), the integration value $S_1$, the clock $clk_R$ sped up, the second analog quantity $A_2$ (the threshold value is shown as $TH_{A2}$), the integration value $S_2$, and the clock $clk_{A2}$ sped up.

In FIG. 1(B), the value of integration value $S_1$ and $S_2$ is replaced by the number of clock clkR and $clk_{A2}$, and the difference of each integration value of the first integration circuit 83 and the second integration circuit 84 is expressed as differences of these numbers. In FIG. 1(B), the clock $clk_R$ and the $clk_{A2}$ are the same. But either clock may be more highspeed than the other.

Figure 2:
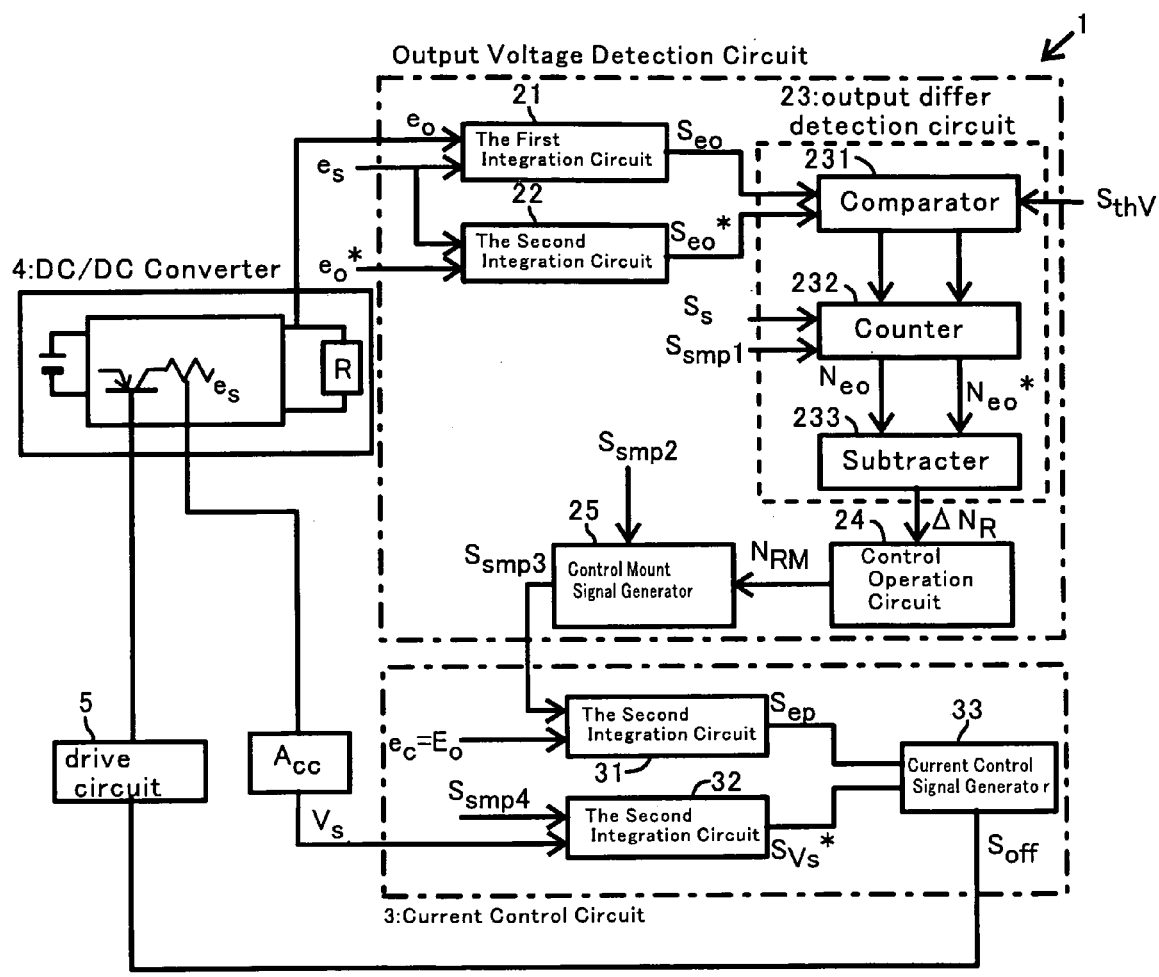
FIG. 2: It is a simple block diagram of the power converter that shows one execution form of the present invention.
Figure 3:
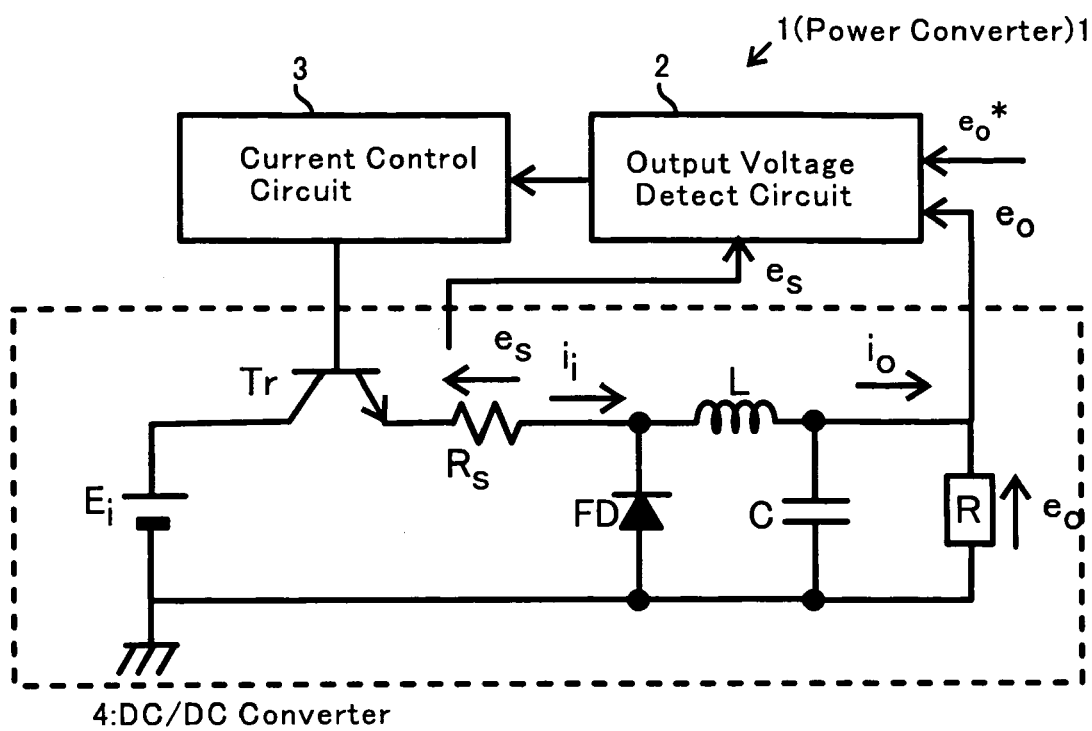
FIG. 3: It is a detailed block diagram of the power converter that shows one execution form of the present invention.

FIG. 1 and FIG. 2 are the explanation diagrams where the power converter of the present invention is shown. The electric power converter 1 has output voltage detection circuit 2, current control circuit 3, and DC/DC conversion circuit 4.

The current control circuit 3 controls the circuit current of the DC/DC conversion circuit 4 (current ii that flows from DC power Ei aiming at reactor L) by on/off switching, based on the deflection between the output voltage $e_o$ detected by the output voltage detection circuit 2 and the target output voltage $e_o*$.

As shown in FIG. 1, the DC/DC conversion circuit 4 has the DC power Ei, the transistor switch Tr, the current detection resistance Rs, the inductor L, the flywheel diode FD, and output capacitor C.

The current (electric power) supplied from power supply (DC power) Ei is supplied to the load R through the current detection resistance Rs and the inductor L. The flywheel diode FD turns on when the transistor switch $T_r$ is turned off, and supplies the energy that accumulates in inductor L to load R. Output capacitor C is a smoothing capacitor.

As shown in FIG. 2, the output voltage detection circuit 2 has the first integration circuit (for the voltage detection) 21, the second integration circuit (for the armature voltage control) 22, the output deflection detection circuit 23, the control operate circuit 24 and the operation quantity signal generation circuit 25.

Figure 6:
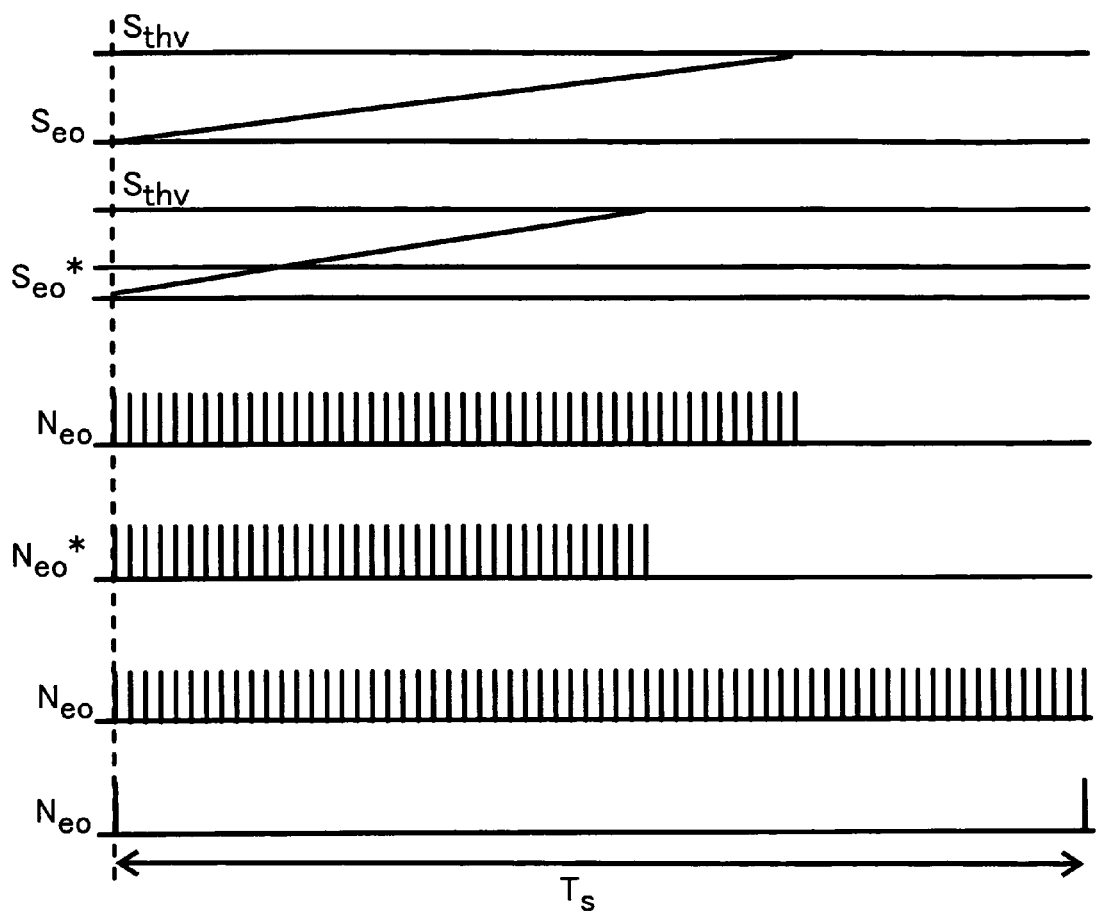
FIG. 6: It is a timing chart where the operation of the second integration circuit for the first integration circuit for the voltage detection of FIG. 2 and the voltage detection is shown.

In the timing chart of FIG. 6, the first integration circuit 21 (for the voltage detection) inputs the output voltage $e_0$ according to the timing of the first clock $S_s$ and outputs the first integration value (for the voltage detection) $S_{eo}$.

In the timing chart of FIG. 6, the second integration circuit 22 (for the voltage detection) inputs the output voltage $e_o*$ according to the timing of the first clock $S_s$ and outputs the second integration value (for the voltage detection) $S_{eo}*$.

The first integration circuit (for voltage detection) 21 and the second integration circuit 22 (for voltage control) 22 can be composed by the capacitor and resistance.

Figure 4:
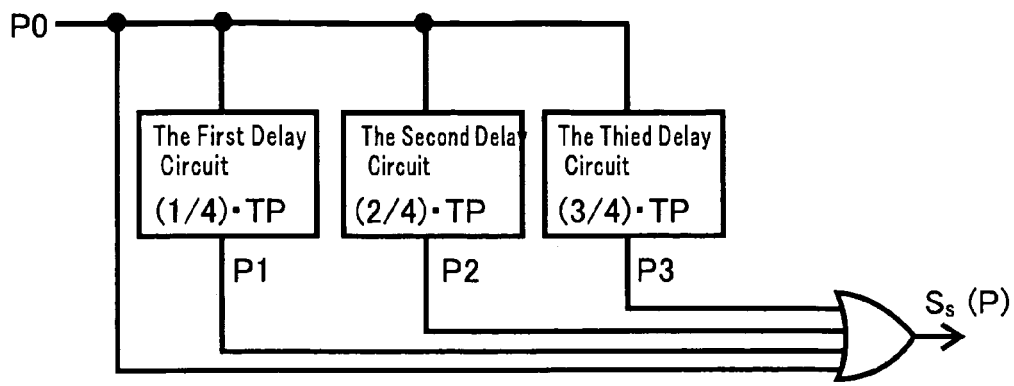
FIG. 4: (A), (B) are the figures where the execution example of attempting making to high accuracy and speed-up is shown.
Figure 4:
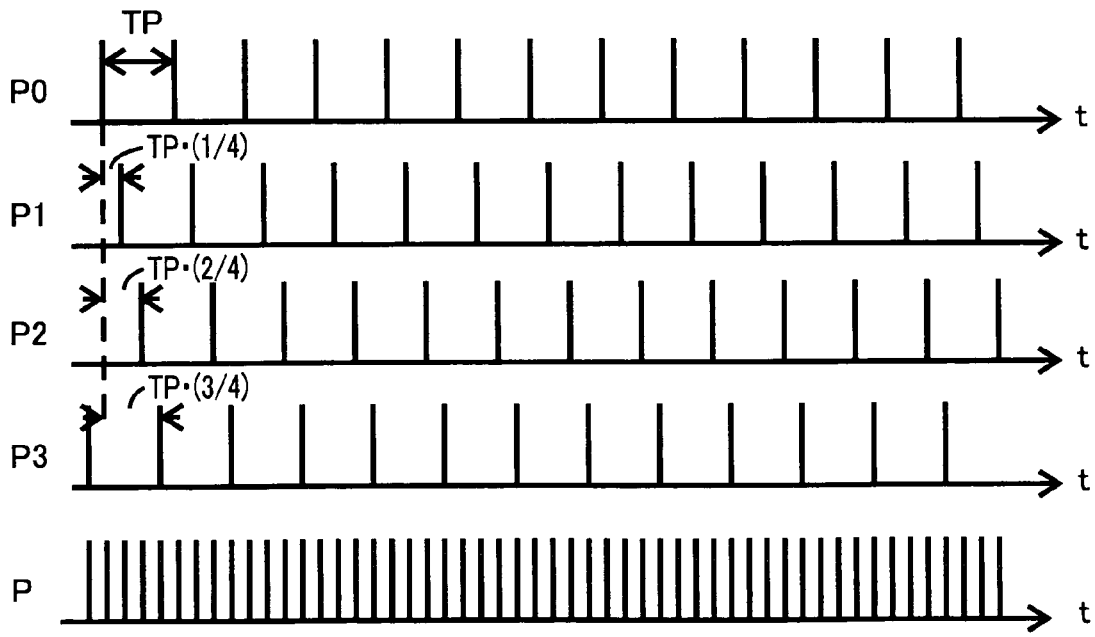

In the first integration circuit 21 and the second integration circuit 22, the first clock Ss is sped up as shown in FIGS. 4(A) and (B), wherein the standard clock P is shifted .TP/N (Tp are a cycle of P, N is integer ("4" in FIG. 4(A))).

Figure 5:
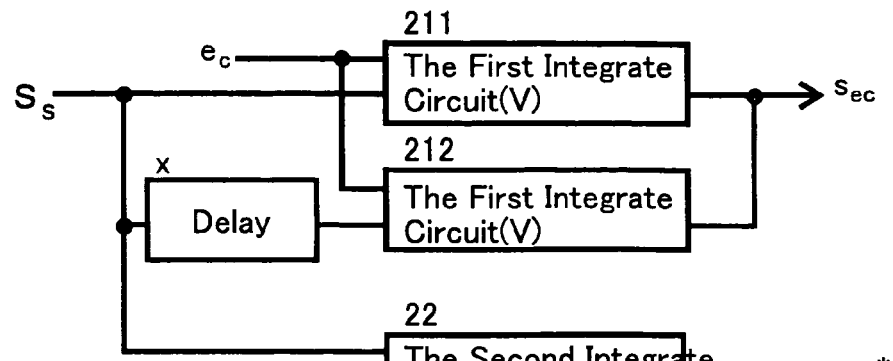
FIG. 5: (A), (B), (C) shows the diagram of the other embodiment for highly accurate making and for speeding up.
Figure 5:
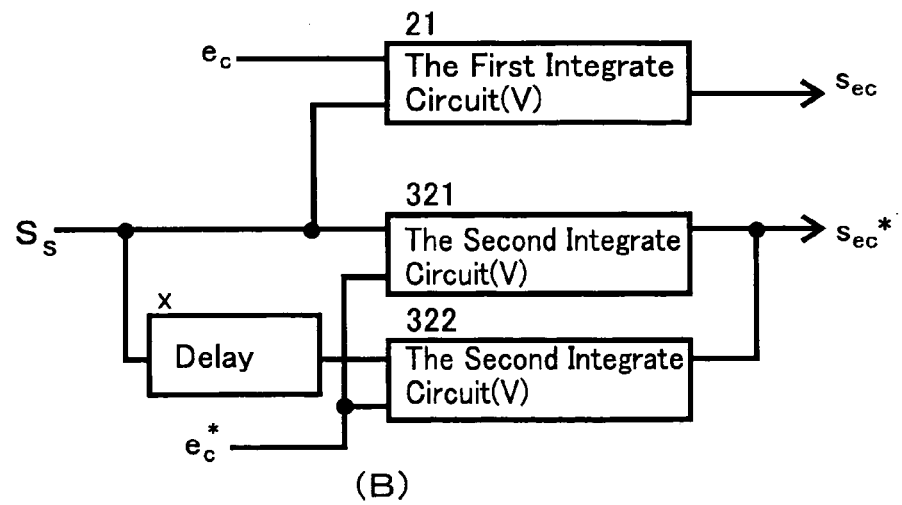
Figure 5:
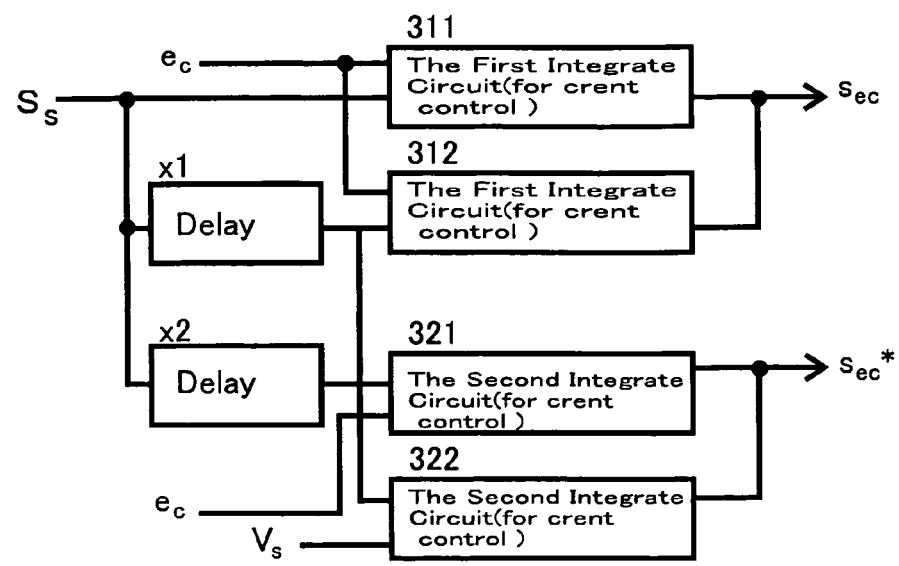

Moreover, the first integration circuit 211,212 of N piece (in FIG. 5(A), N=2) can be used as shown in FIG. 5(A).

The delay x can shift the operation timing of these circuits 211,212 only at preset time (TP/N). As a result, the accuracy of the voltage detection rises, and operation is sped up.

Moreover, the second integration circuit 221,222 of N(N=2) piece can be used as shown in FIG. 5(B). The operation timing of integration circuit 221,222 is shifted by delay x only at preset time (TP/N). As a result, the accuracy of the voltage control rises, and operation is sped up.

In addition, the first integration circuit (for voltage detection) 211,212 and the second integration circuit (for voltage detection) 221,222 of N (in FIG. 5(C), N=2) sets can be used as shown in FIG. 5(C). The operation timing of these integration circuits 221,222 is shifted by delay x only at preset time (TP/N). As a result, the accuracy of the voltage detection (and control) can be raised and operation be sped up.

The output deflection detection circuit 23 consists of the comparator 231, the counter 232, and the subtracter 233. The comparator 231 compares the time until the first integration value (for voltage detection) Seo reaches to the preset value $Vth_{v1}$ and the time until the second integration value (for voltage detection) Seo* reaches to the preset value $Vth_{v2}$ In this embodiment, it is as same threshold $Vt_{hv}$ the first preset value Vthv1 and the second preset value $Vth_{v2}$.

The counter 232 counts the time Neo (the time until the first integration value $S_{eo}$ reaches to threshold $Vth_v$) and the time Neo* (the time until the second integration value $S_{eo}*$ reaches to threshold $Vth_v$), by calculating the pulse number of pulses of clocks Ssmp1 as shown FIG. 6.

Subtracter 233 calculates the difference ΔNR using the pulse number of the clocks (for voltage deflection detection) Ssmp1, and outputs the differ between the voltage value $e_o$ and the target output voltage value $e_{eo}*$ as the digital deflection value ΔNR.

The control operation circuit 24 inputs digital deflection value ΔNR, and generates numerical value $N_{RM}$ digital to control the current control circuit 3 based on this value ΔNR.

In FIG. 6, the clock Ssmp1 is one by one cycle $T_e$ (one cycle of on-off of transistor switch Tr) of the first clock $S_e$ (Numerical value NRM for controlling the current control circuit 3 is detected one time, or more time).

Figure 7:
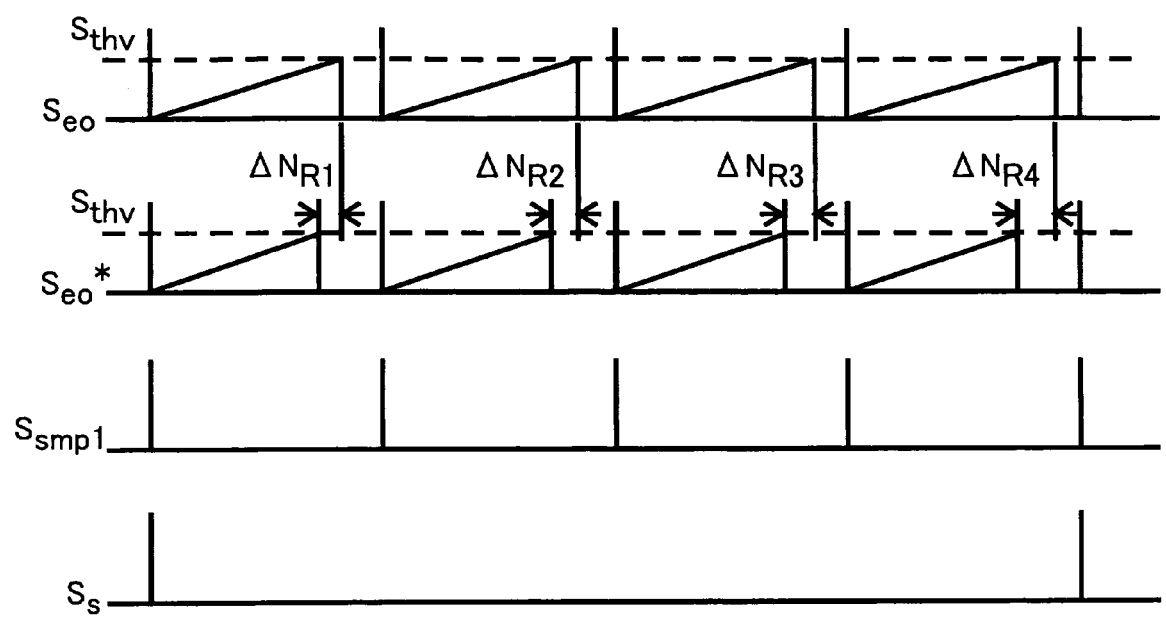
FIG. 7: It is a diagram that the appearance in which difference a cycle ΔNR of the first clock of the coefficient value recorded is detected two or more times is shown.

In FIG. 7, the appearance in which difference ΔNR of the coefficient value is detected two or more times (the measurement value is indicated four times here it with ΔNR1, ΔNR2, ΔNR3, and ΔNR4) will be shown in one cycle $T_e$ of the first clock $S_e$.

Figure 8:
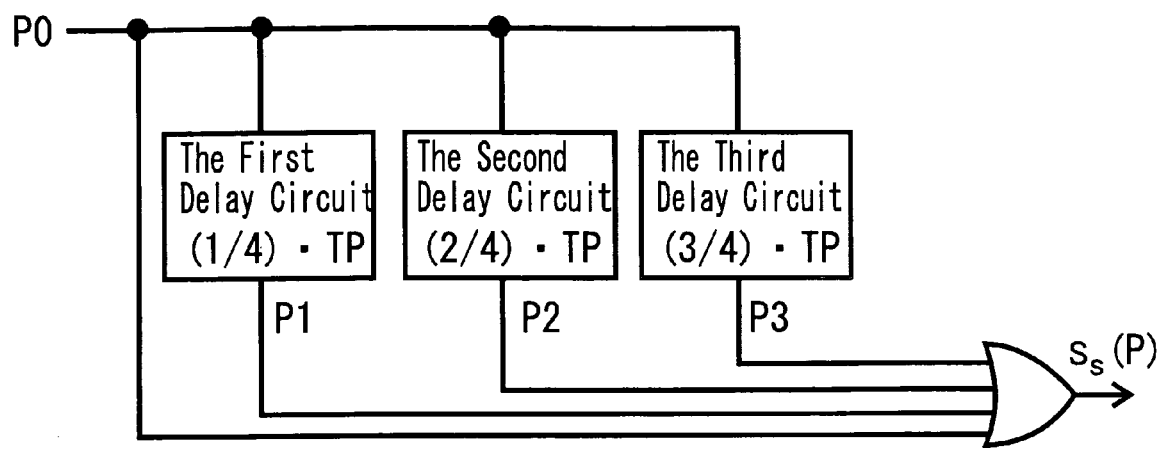
FIG. 8: It is an explanation diagram for the shift of two or more 1/N pulse o the cycle of a reference pulse, and the assumption of driving cycle on substance N a reference pulse at the cycle.

As shown in FIG. 8, two or more pulses P1, P2, P3, and P4 can preset comparatively shift to reference pulse P0 in 1/N (¼ in the example). As a result, it can be N times (4 times in the example) at the cycle of reference pulse TP as for driving cycle P on substance.

The operation quantity signal generation circuit 25 generates the operation quantity signal that changed the timing of the reference clock signal (reference signal Ssmp2) at time.

This time quantity of the change is the time corresponding to a digital numerical value that corresponds to the target output voltage $e_o$ of the output voltage eo* and deflection. The resolution of this time quantity of the change is higher than the frequency of a reference clock.

That is, the operation quantity signal generation circuit 25 inputs the signal (reference signal Ssmp2) that becomes a reference of the time of operation in numerical value NRM digital and current control circuit 3.

Figure 9:
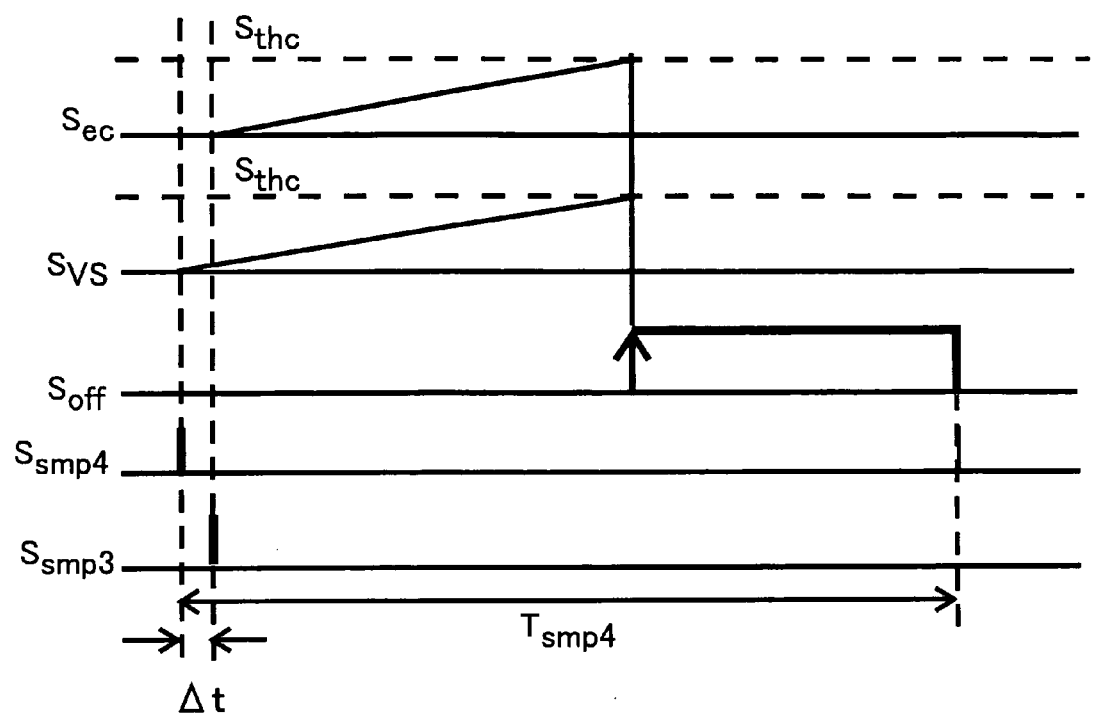
FIG. 9: It is a timing chart where the operation of the operation quantity signal generation circuit of FIG. 2 is shown.

And, the operation quantity signal generation circuit 25 generates operation quantity signal Ssmp3 as shown in FIG. 9.

This operation quantity signal Ssmp3 is a signal that changed standing up of signal Ssmp2 at time only at time corresponding to numerical value NRM digital.

For instance, the frequency of signal Ssmp2 is 25 MHz, and the resolution of time change Δt is 25 GHz.

The operation quantity signal generation circuit 25 comprises the decoder 251 and the delay circuit 252. The decoder 251 inputs numerical value $N_{RM}$, and outputs two or more bit signal $S_{RM}$. The delay circuit 252 inputs the signal $S_{RM}$ and the reference signal $S_{smp2}$.

Figure 10:
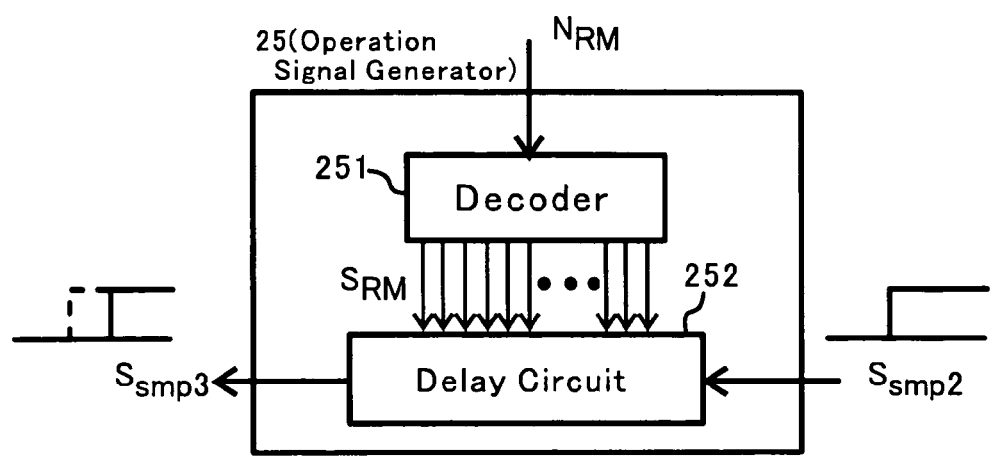
FIG. 10: It is a figure that one illustration of the operation quantity signal generation circuit in the power converter of FIG. 2.
Figure 11:
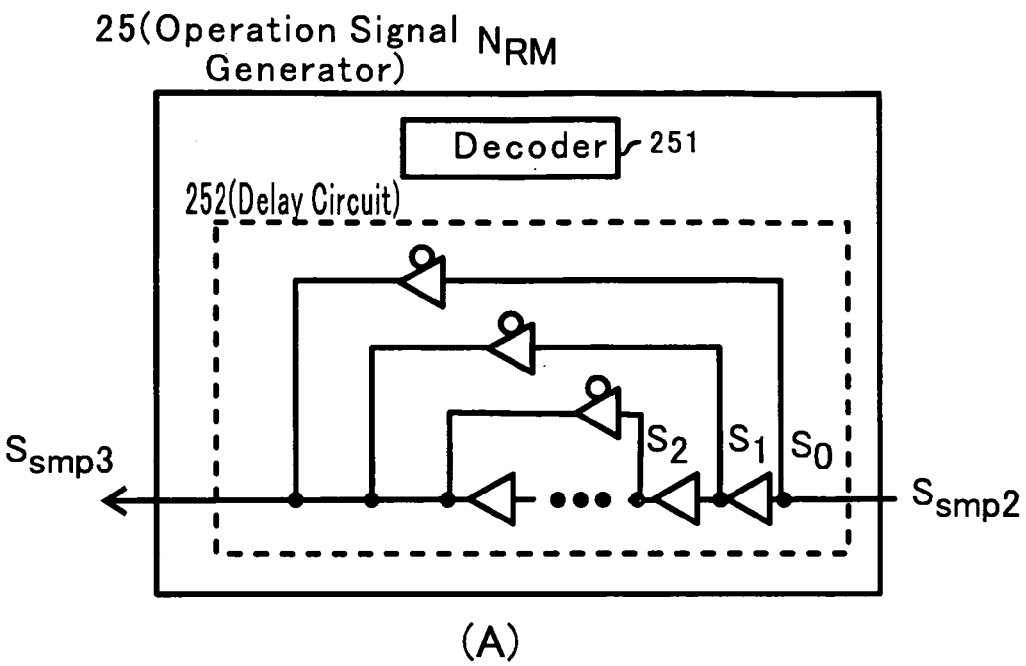
FIG. 11: (A) is a figure where the operation quantity signal generation circuit of FIG. 10 is concretely shown, and (B) is a timing chart of this circuit.
Figure 11:
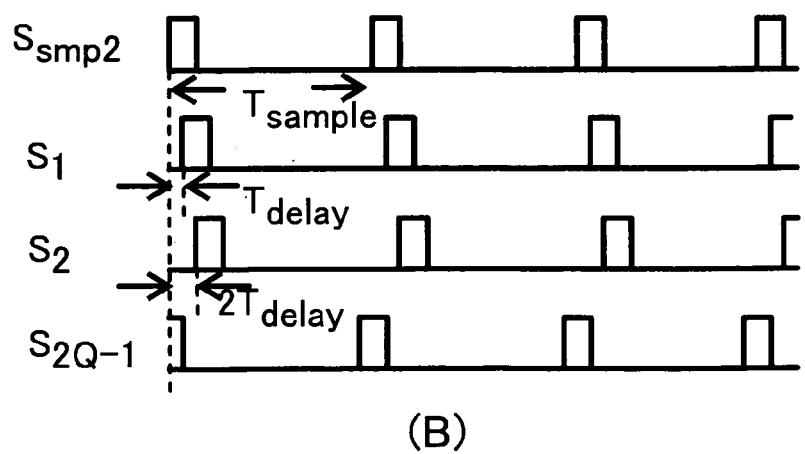

The circuit that materializes operation quantity signal generation circuit 25 of FIG. 10 to FIG. 11(A) is shown, and the timing chart of this circuit is shown in FIG. 11(B).

The circuit of FIG. 11(A) is a delay circuit that used two or more buffers. This delay circuit generates signal ($S_1, S_2, \ldots$) with the delay time. The delay time depends on the buffer number that signal S0 passes. Or instance, when numerical value NRM (digital value) is Q bit, the delay signal of $2^Q$ kind of is prepared. These delay signals are signals to delay clock $S_{smp2}$. The numerical value $N_{RM}$ is converted into signal $S_{RM}$ with the decoder 251. An arbitrary delay can be generated by selecting the buffer corresponding to this $S_{RM}$.

The buffer number can be assumed to be about 1000. Therefore, it is generally operation quantity signal Ssmp3 with 1000 times resolution accuracy (25 GHz), if the clock Ssmp2 is 25 MHz.

Figure 12:
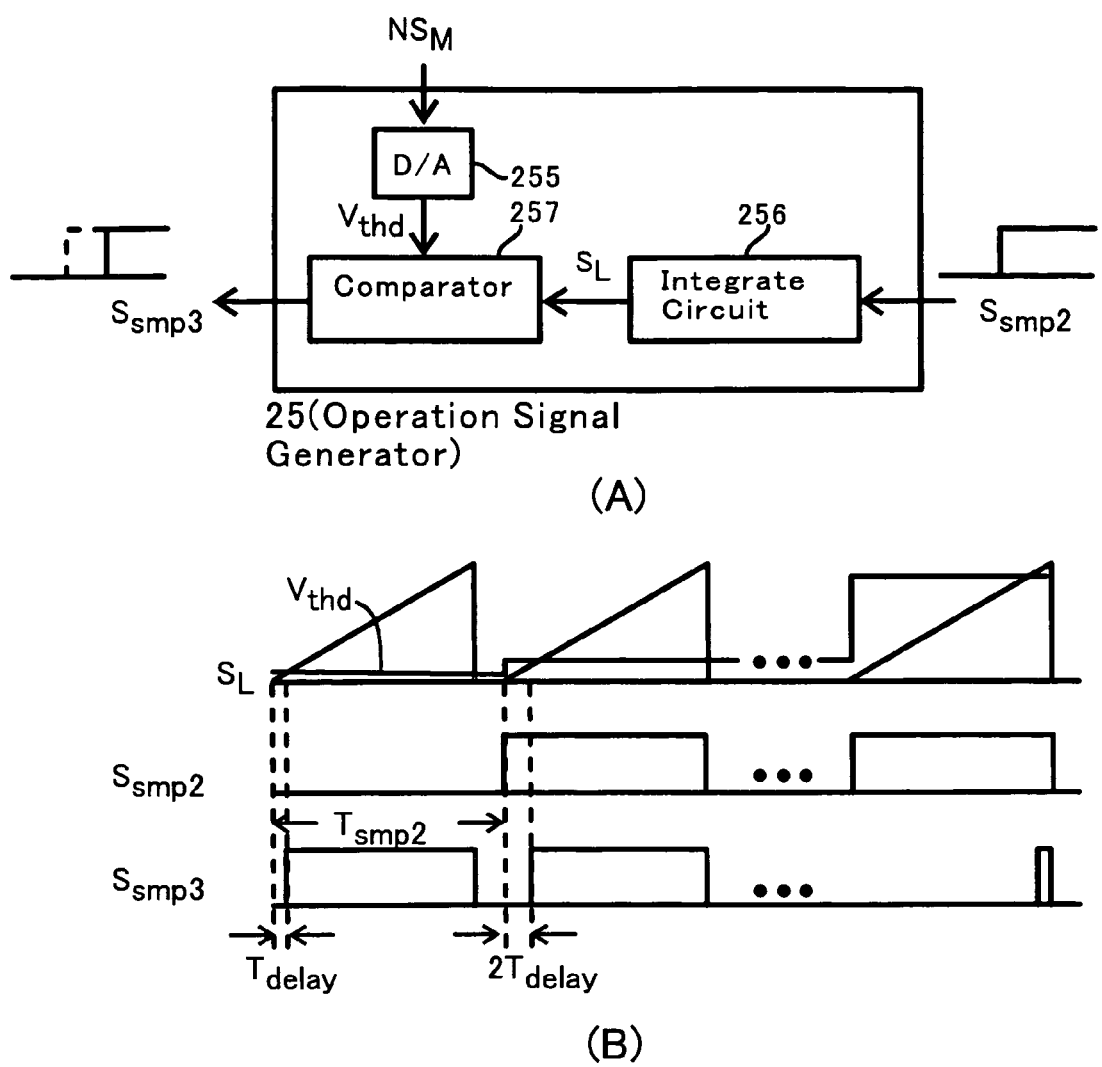
FIG. 12: (A) is a figure where other examples of the operation quantity signal generation circuit are shown, (B) is a timing chart of the circuit.

FIG. 12(A) shows other composition examples of the operation quantity signal generation circuit 25.

The operation quantity signal generation circuit 25 of FIG. 12(A) is composed of the digital-to-analog converter 255, the integration circuit 256, and the comparator 257. The digital-to-analog converter 255 inputs a digital numerical value to the control current control circuit 3, and outputs the analog threshold voltage. The integration circuit 256 inputs the reference signal Ssmp2 and the outputs the integration value voltage $S_L$. The comparator 257 outputs the comparison value of the integration value voltage and the analog threshold voltage. The numerical value NRM digital is set to threshold voltage $V_{th}$ by converting D/A. When the reference signal Ssmp2 is input, the integration is begun with the integration circuit 256.

Because the time until the output $S_L$ of the integration circuit reaches to the threshold is decided depending on the threshold. Thus, the delay according to numerical value $N_{RM}$ is generated. FIG. 12(B) shows the timing chart of this circuit.

When the radio-frequency signal is used (For instance, when the radio-frequency signal can be acquire from an external circuit), about 25 GHz can compose the operation quantity signal generation circuit 25 of the counter.

The output of the output voltage detection circuit 2 described above is given to the current control circuit 3 as shown in FIG. 2.

The current control circuit 3 has the first integration circuit (for the current control) 31, the second integration circuit (for the current control) 32, and current control signal generation circuit 33.

The first integration circuit (for the current control) 31 inputs preset value ec according to the timing of standing up of operation quantity signal Ssmp3 and outputs the first integration value (for the current control) Sep for the current control.

The second integration circuit (for the current control) 32 inputs the voltage Vs according to the timing (Here, timing of Ssmp2) that synchronizes with standing up of the reference clock $S_{smp4}$ (reference signal), and outputs the second integration value (for the current control) $S_{Vs}$.

Voltage $V_s$ is a voltage in which preset gain $A_{cc}$ is put on voltage $e_s$ that corresponds to the current that flows in the inductor L.

The current control signal generation circuit 33 compares the first integration value (for the current control) $S_{ep}$ and the second integration value (for the current control) $S_{Vs}$ in this execution form with analog.

For instance, the current control signal generation circuit 33 can sample the first integration value (for the current control) $S_{ep}$ and the second integration value SVs with a clock with the resolution of time change Δt, and compare these integration values.

Figure 13:
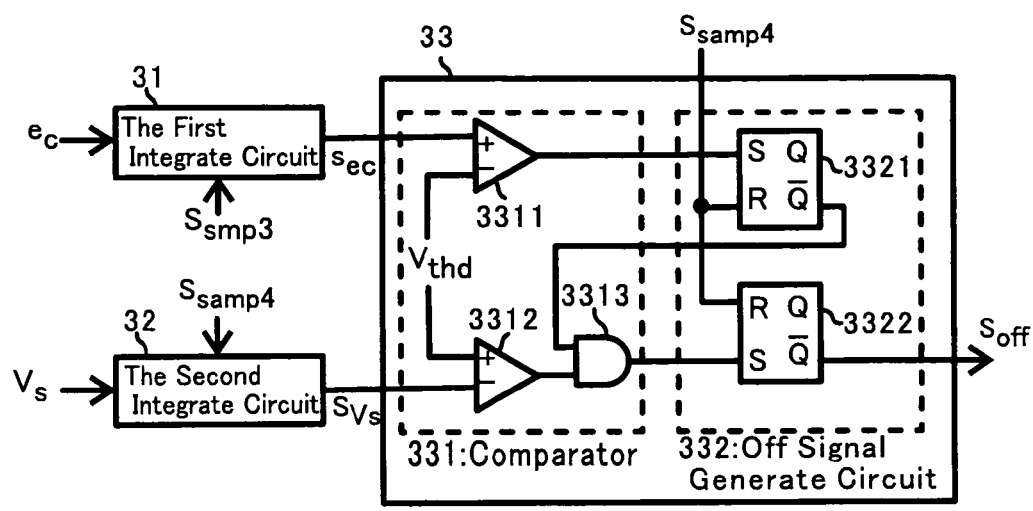
FIG. 13: It is a figure that one illustration of the current control signal generation circuit in the power converter of FIG. 2.
Figure 14:
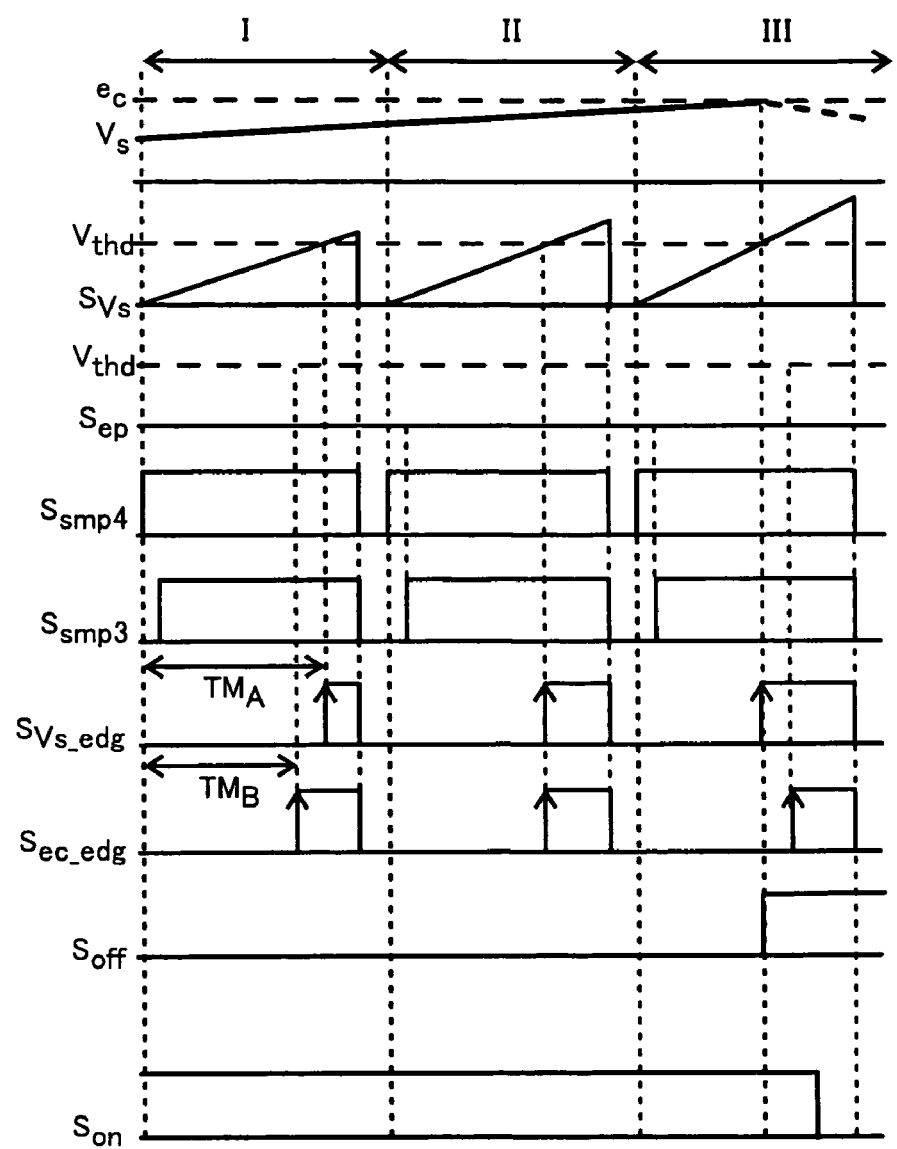
FIG. 14: It is a timing chart where the operation of the current control signal generation circuit of FIG. 13 is shown.

The current control signal generation circuit 33 can be composed of the comparison circuit 331 and off the signal generation circuit 332 as shown in FIG. 13 for instance. FIG. 14 shows the timing chart of the operation of current control signal generation circuit 33. The circuit 331 consists of the comparator 3311,3312 and AND gate 3313.

The comparison Comparator 3311 compares the first integration value Sep (for the current control) and the first preset value $V_{th3}$, and outputs the comparison result as $S_{ep\_edg}$. The comparator 3312 compares the second integration value $S_{Vs}$ (for the current control) and the second preset value $V_{th4}$, and outputs the comparison result as $SV_{s\_edg}$. In FIG. 14, it is the same value $V_{thc}$ as preset value $V_{th3}$ and $V_{th4}$.

The off signal generation circuit 332 is composed by two FF circuits 3321, 3322 in FIG. 13.

FF circuit 3321 generates current control signal $S_{off}$ following the time to reaching to the second preset value $V_{th4}$ (It is Vthc here) by the second integration value (for the current control) $S_{Vs}$ the time until the first integration value (for the current control) $S_{ep}$ reaches to the first preset value $V_{th3}$ (it is Vthc, in this embodiment).

The current control signal $S_{off}$ turns off the current ii that flows from the DC power $E_i$ aiming at the inductor L.

That is, the set value $e_c$ is input to the first integration circuit (for the current control) 31 at each cycle of the clock $S_{ssmp2}$ (Or, $S_{smp3}$) and the reference clock $S_{smp4}$. The voltage $V_s$ is input to the second integration circuit (for the current control) 32, integrated respectively, and converted into the signal $S_{Vs}$ and $S_{ep}$. When synchronizing clock $S_{smp3}$ and $S_{smp4}$ are input, the integration is begun.

The output $S_{ec}$ of the first integration circuit 31 compared with $V_{thc}$ by the comparator 3311, the output $S_{vs}$ of the second integration circuit 32 compared with $V_{thc}$ by the comparator 3312.

In FF3321 and FF3322, when the input S becomes "1", the output (Q with an over score) becomes "0". Even if the pulse $S_{Vs\_edg}$ stands up in the same cycle, the result is not reflected in the flip-flop because this signal returns to the input of AND gate 3313. The off signal $S_{off}$ is not generated when the voltage $V_s$ of this state is smaller than that of the set value $e_c$. because it continues first at the next cycle from be input the reset signal (reference clock Ssmp4) to the flip-flop.

Figure 15:
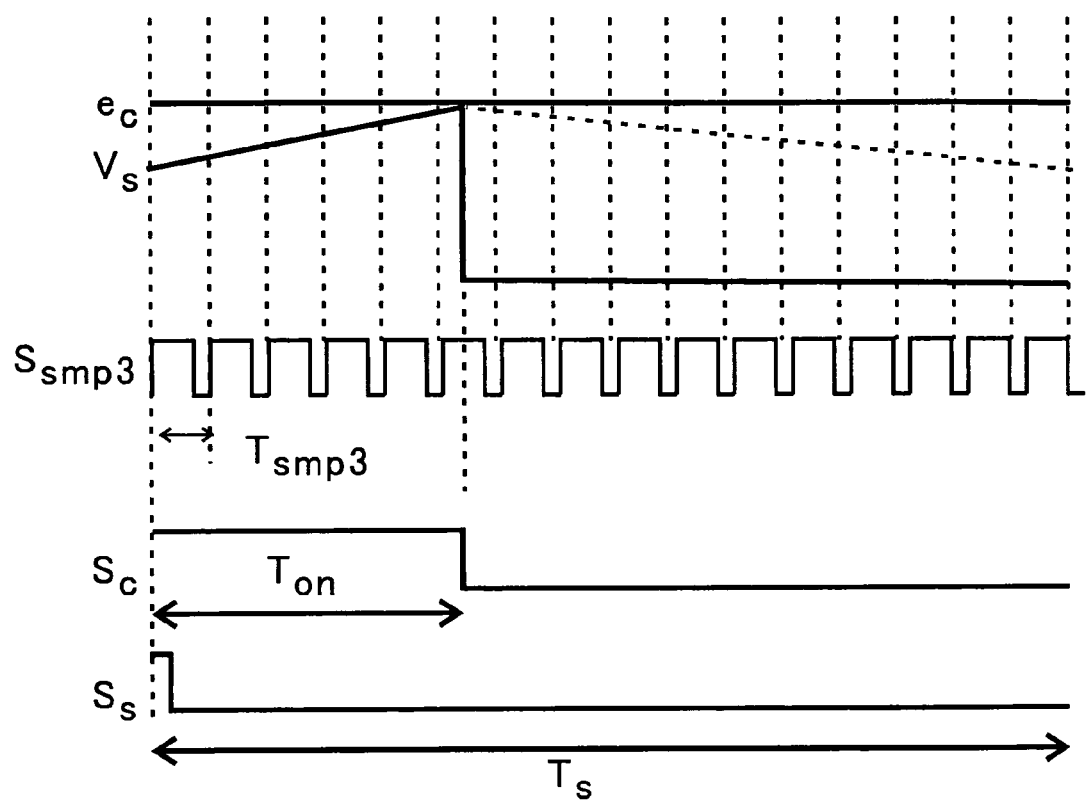
FIG. 15: It is a timing chart to explain the movement of the power converter of FIG. 2 concisely.

As for the current control signal generation circuit 33, the voltage $V_s$ (voltage in which gain $A_{cc}$ is put on the voltage $e_s$ that corresponds to the current that flows in inductor L) is input to the first integration circuit 31 for the current control. The current control signal $S_{off}$ is generated when this input value reaches the integration value of preset value $e_c$, and the transistor switch Tr is turned off (refer to the timing chart for FIG. 15).

Figure 16:
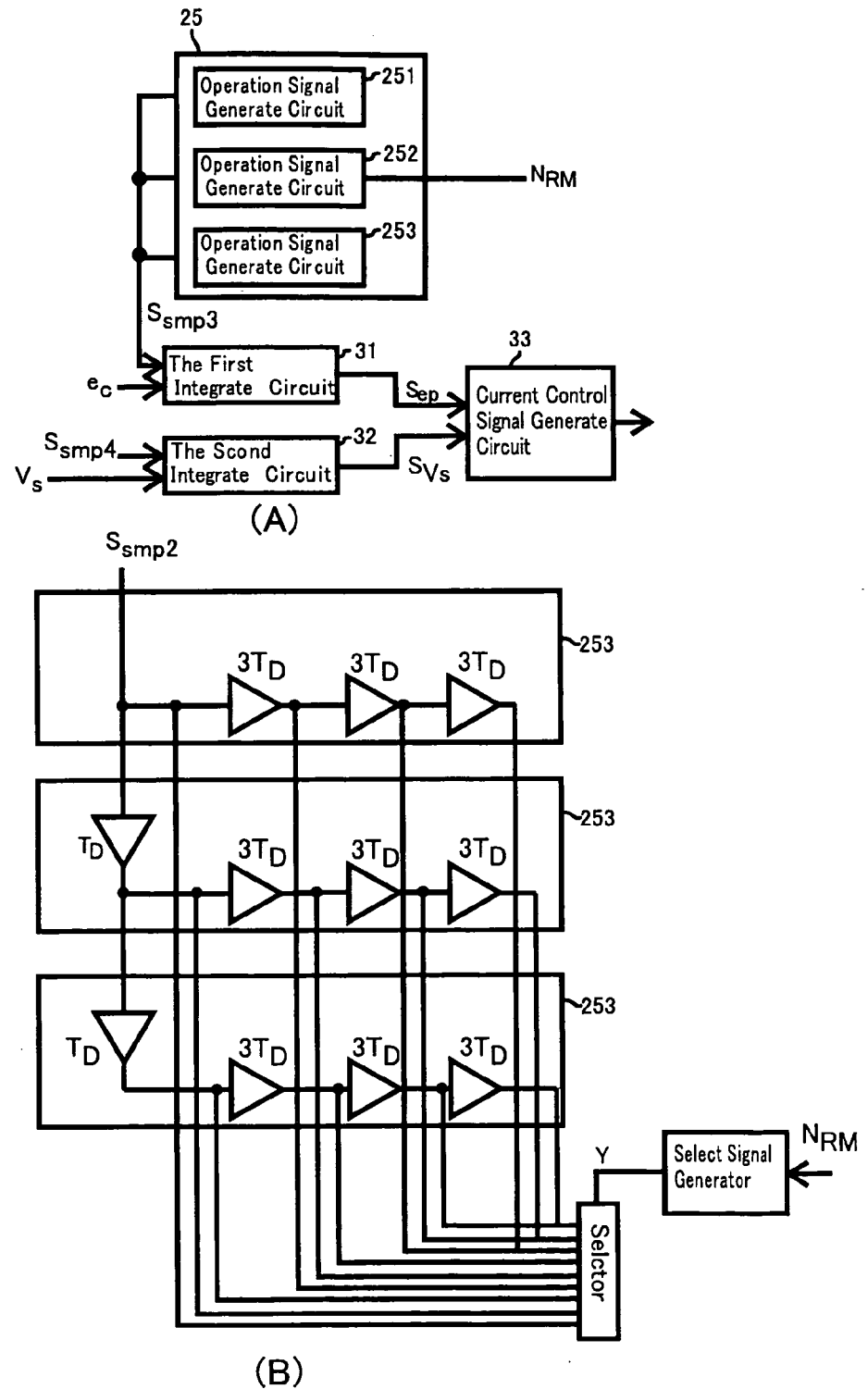
FIG. 16: (A) shows the composition diagram where the detection accuracy is raised and operation was sped up by making the operation quantity signal generation circuit a plural, and (B) shows a concrete composition of the operation quantity signal generation circuit.

Moreover, as shown in FIG. 16(A), two or more the operation quantity signal generation circuits (25) can be moutet (in this embodiment, three circuits shown by 251,252,253). In FIG. 16(A), the detection accuracy raises and the operation was sped up. FIG. 16(B) shows a concrete composition of operation quantity signal generation circuit 25. The reference clock $S_{amp2}$ diverges to the plural as shown in FIG. 16(B). And the delay signal is caused by each delay element selected with selector Y, and outputs as $S_{amp2}$.

Figure 17:
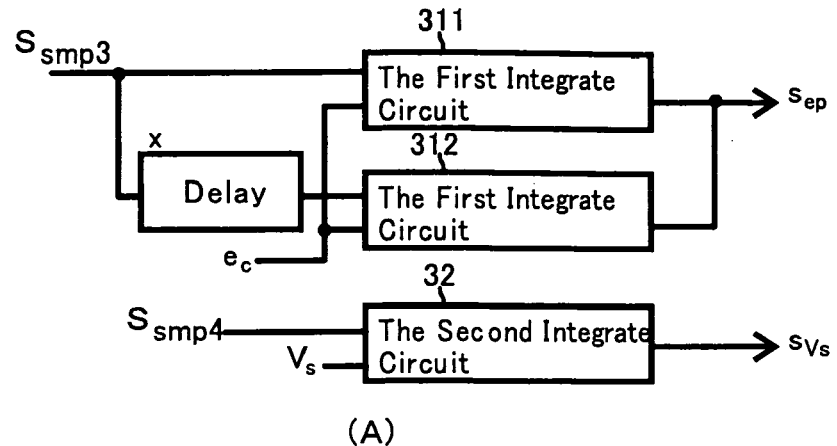
FIG. 17: (A), (B), (C) are figures where the example of the design change of the power converter mentioned above is shown.
Figure 17:
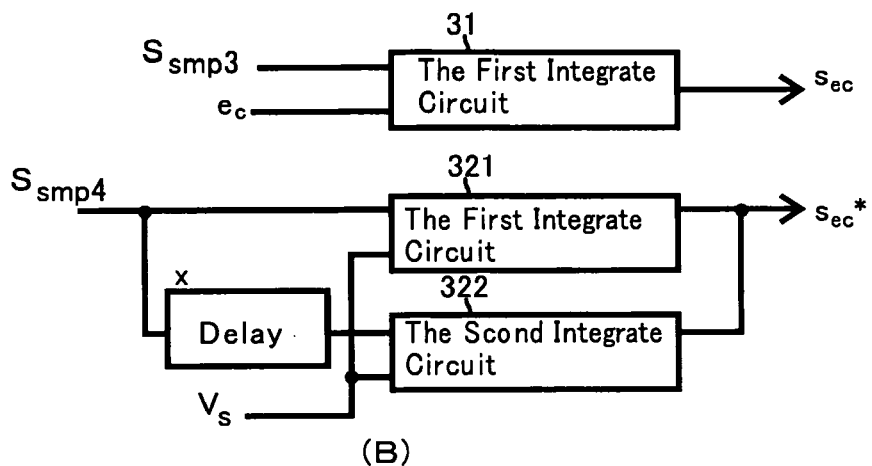
Figure 17:
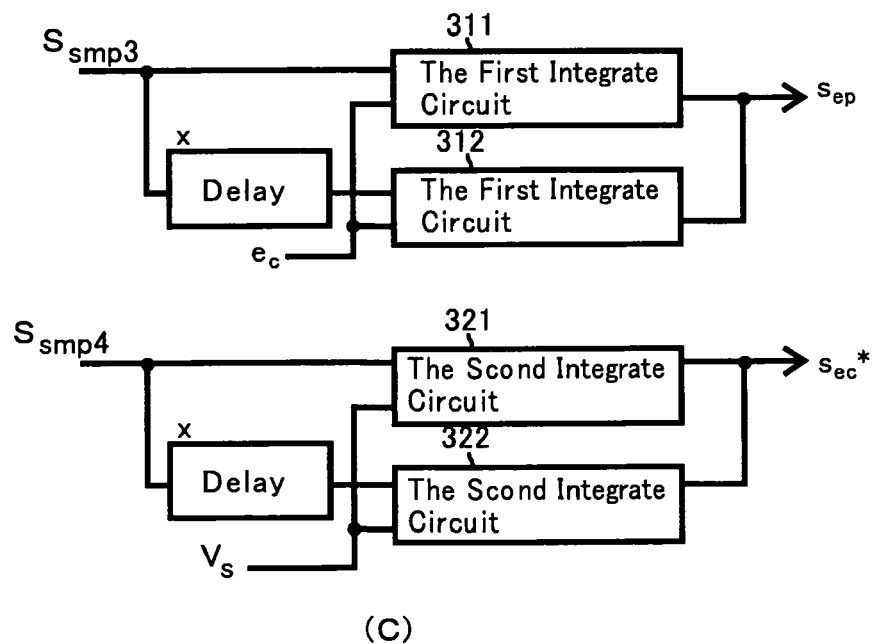

FIGS. 17(A), (B), and (C) are the diagrams where the example of the design change of the power converter mentioned.

FIG. 17(A) shows the example of raising the detection accuracy and speeding up operation by two or more sets (two FIG. 17(A)) mounting the first integration circuit (for the current control) 31.

In this example, Ssmp3 input to the first integration circuit (for the current control) 311 and the first integration circuit 312 for the current control is late for Ssmp3 input to the first integration circuit (for the current control) 311 at ½ cycles.

FIG. 17(B) shows the first integration circuit 31 for the current control and the second integration circuit 32 for the current control and the installing example of two or more classes (two FIG. 17(B)) is shown.

As a result, the detection accuracy rises, and operation is sped up.

In this example, Ssmp4 input to the second integration circuit (for the current control) 321 is late for Ssmp4 input to the second integration circuit (for the current control) 322 at ½ cycles.

The first integration circuit (for the current control) 31 and the second integration circuit (for the current control) 32 show the installing example of two or more classes (two FIG. 17(A)) in FIG. 17(C).

As a result, the detection accuracy rises, and operation is sped up.

In this example, Ssmp3 input to the first integration circuit (for the current control) 311 and the first integration circuit (for the current control) 312 is late for Ssmp3 input to the first integration circuit 311 for the current control at ½ cycles.

Moreover, Ssmp4 input to the second integration circuit 321 for the current control is late for Ssmp4 input to the second integration circuit 322 for the current control at ½ cycles.

Figure 18:
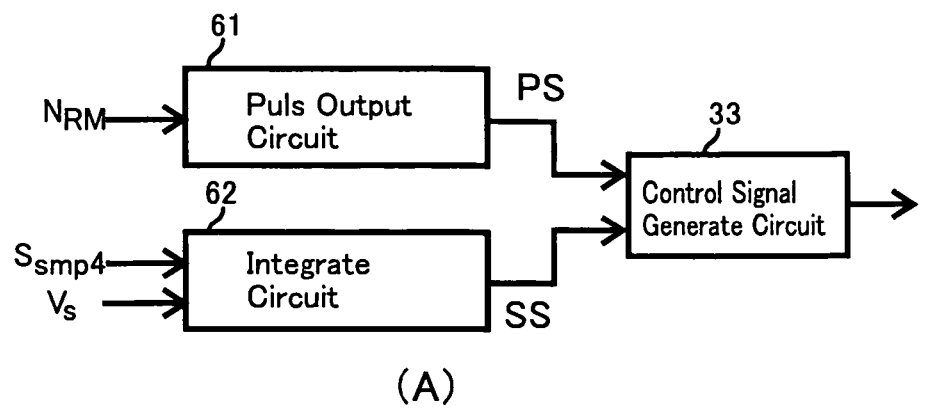
FIG. 18: (A), (B) are explanation diagrams of the prior art.
Figure 18:
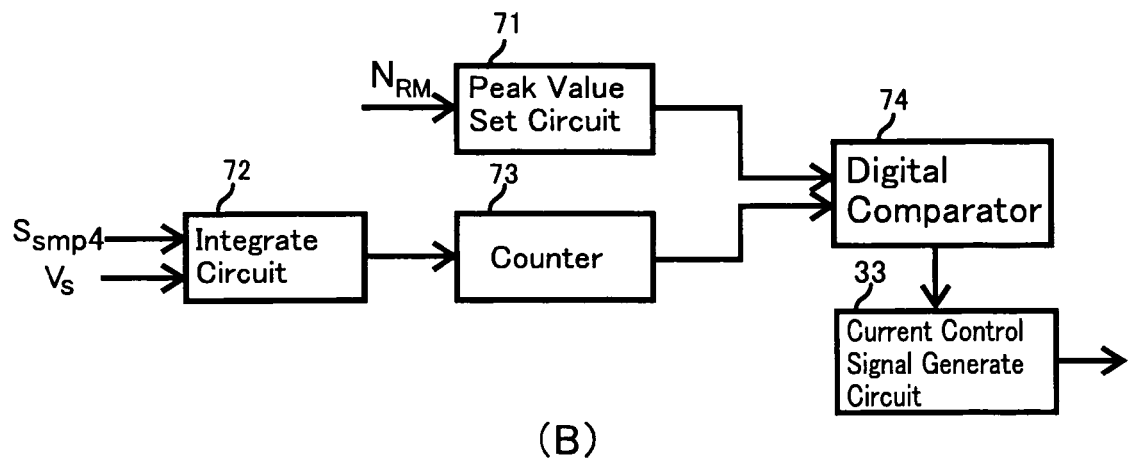
Figure 19:
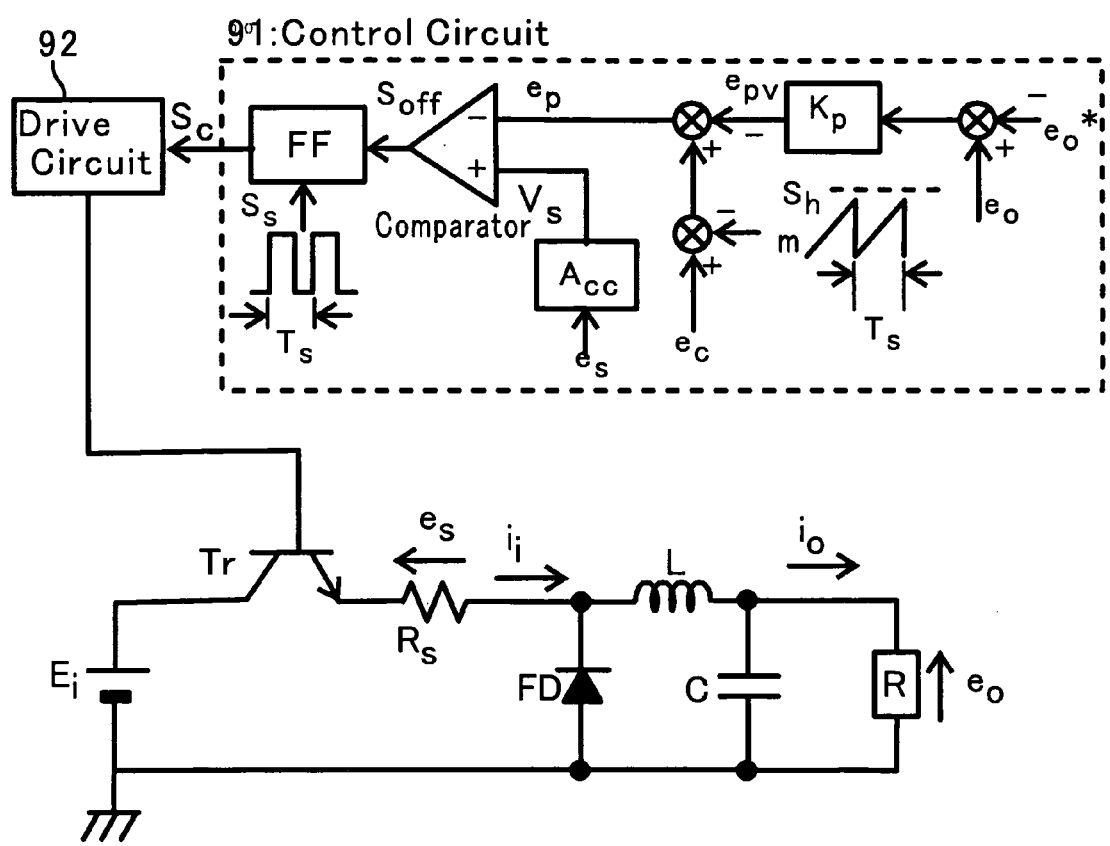
FIG. 19: It is figure where a past electric power conversion circuit is shown.
Figure 20:
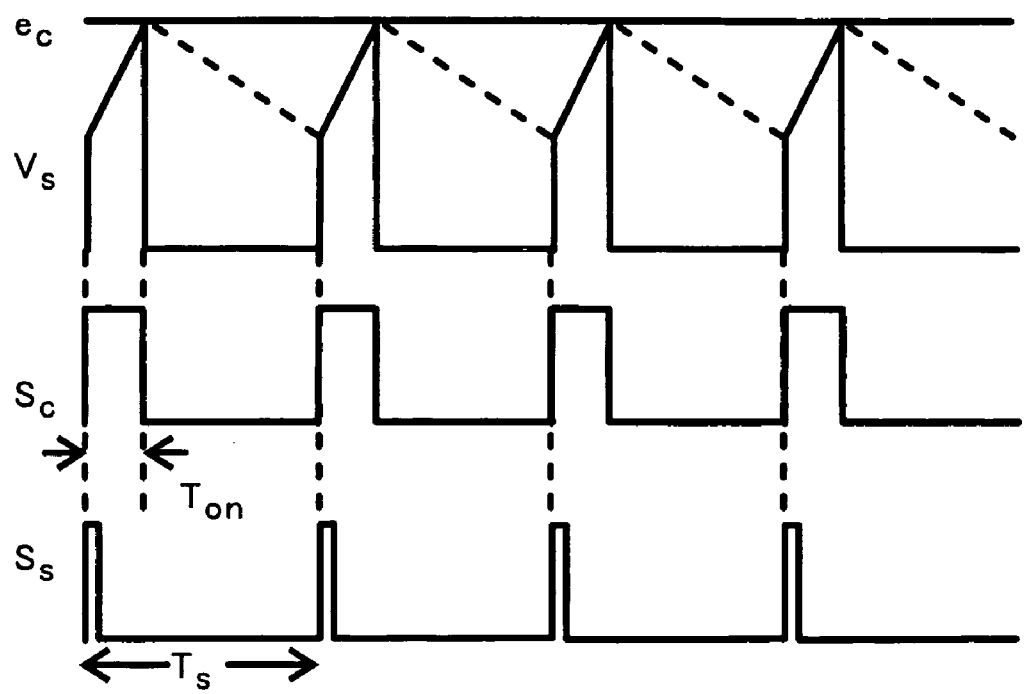
FIG. 20: It is an operation explanation diagram of the electric power conversion circuit of FIG. 19.

It is also possible to input NMR to pulse output circuit 61 as shown in FIG. 18(A), to output pulse row PS, to input Ssmp4 and voltage Vs to integration circuit (for the current control) 62, to output train of impulses SS, to input these pulse row PS and SS to control signal generation circuit 33, and to generate the control signal.

Moreover, the value that inputs NMR to peak value setting circuit 71 as shown in FIG. 18(B) and corresponds to the peak value can be output.

Ssmp4 and voltage Vs are input to integration circuit 72 (for the current control), and train of impulses SS is output, and on the other hand, this is done with counter 73 and several in total can be done.

The outputs of above-mentioned calculation value and peak value setting circuit 71 (value that corresponds to the peak value) can be compared with digital comparator 74, the comparison result be sent to control signal generation circuit 33, and the control signal be generated.

However, the circuit in the present invention is superior to the circuit described in FIGS. 18(A) and (B) from reliability and the viewpoint of high speed etc.

It was made to convert the voltage deviation into the time quantity, to convert the current measurements into the time quantity in this execution form as explained above, and to control.

That is, because the response accuracy (control accuracy) depends on the frequency of the clock on substance, an efficient power converter can be offered.

The invention claimed is:

1. A signal comparison circuit for generating target signal from analog quantity and digital quantity, comprising,
    a first integration circuit that inputs reference signal and outputs integration value,
    a second integration circuit that inputs the analog quantity and outputs integration value,
    a operation signal generation circuit that converts the digital quantity into the time quantity, and shifts the operation start timing of the first integration circuit to the operation start timing of the second integration circuit, and
    a target signal generation circuit that compares the time to each reaching to a threshold by the first integration circuit and the second integration circuit and generates the target signal.

2. A signal comparison circuit according to claim 1, wherein the analog quantity is a second analog quantity and the digital quantity is generated from a first analog quantity.

3. Power converter by which output voltage detection circuit detects output voltage value, and current limit circuit on-off controls current that flows from DC power aiming at inductor based on deflection between analog quantity of first and target output voltage value, wherein
    the output voltage detection circuit has an operation quantity signal generation circuit that generates an operation quantity signal that changed the timing of standing up of reference clock signal with resolution that is higher than the frequency of a reference clock at time only at time corresponding to a digital numerical value that corresponds to the deflection between the output voltage value and the target output voltage value,
    the current limit circuit has a first integration circuit for the current control, a second integration circuit for the current control, and a current control signal generation circuit, wherein
    the first integration circuit for the current control inputs the voltage provided depending on the peak value of the current that flows in the inductor according to the timing of standing up of the said operation quantity signal and outputs a first integration value for the current control,
    the second integration circuit for the current control outputs the voltage that corresponds to the current that flows in the inductor, and it inputs repeatedly and a second integration value for the current control is output two or more times again once according to the timing that synchronizes with standing up of the reference clock signal, the current control signal generation circuit compares the time to reaching to second preset value by the second integration value to reaching to a first preset value by the first integration value for the current control for time and the current control, the time to reaching to the first preset value by the first integration value for current control is, (a) to the value the second integration value for control current below the equal following the time to reaching, (b) to the value the second integration value for control current more than the equal more than the time to reaching, the current that flows the DC power aiming at the inductor is turned off.

4. A signal comparison circuit according to claim 1, wherein an output voltage detection circuit has, the first integration circuit for voltage detection that inputs the output voltage value according to the timing of a preset clock, and outputs the first integration value for the voltage detection, the second integration circuit for the voltage detection that inputs the target output voltage IV value according to the timing of the preset the clock and outputs the second integration value for the voltage detection, an integration circuit for voltage detection that inputs the target output voltage value according to the timing of the preset the clock and outputs the second integration value for the voltage detection, the second integration circuit for the voltage detection that inputs the target output voltage value according to the timing of the preset the clock and outputs the second integration value for the voltage detection, an output deflection detection circuit that does the difference with the time to reaching to the second preset value by the second integration value to reaching to the first preset value by the first integration value for the voltage detection for time and the voltage detection and several in total is done according to the number of pulses of clocks for the voltage deflection detection, and this calculation value is output as a digital deviation value in which the deflection between the output voltage value and the target output voltage value is shown, and a control operation circuit that inputs a digital deviation value, and generates a digital numerical value to control the current control circuit based on the digital deviation value, wherein:

the operation quantity signal generation circuit inputs the standard clock signal that becomes a standard of the time of operation in the digital numerical value and the current control circuit, and generates the operation quantity signal that changed the timing of the standard clock signal at time only at time corresponding to the digital numerical value.

5. A signal comparison circuit according to claim 3, wherein the operation quantity signal generation circuit has, a decoder that inputs digital numerical value to control the current limit circuit, and outputs two or more bit signal, and a delay circuit that inputs the two or more bit signal and the standard clock signal.

6. A signal comparison circuit according to claim 3, wherein the operation quantity signal generation circuit has, digital-to-analog converter that inputs a digital numerical value to control the current control circuit, and outputs an analog threshold voltage, and comparator that outputs a comparison value of an integration circuit, the integration value voltage, and the analog threshold voltage in which the standard clock signal is input and the integration value voltage is output.

* * * * *